US008756346B2

(12) United States Patent
Won et al.

(10) Patent No.: US 8,756,346 B2
(45) Date of Patent: Jun. 17, 2014

(54) APPARATUS AND METHOD FOR TRANSITING TERMINAL FUNCTION BETWEEN PORTABLE TERMINAL AND PERIPHERAL APPARATUS

(75) Inventors: Young-Min Won, Suwon-si (KR); Nam-Hoon Kim, Suwon-si (KR); Myeong-Gi Jeong, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 13/192,066

(22) Filed: Jul. 27, 2011

(65) Prior Publication Data
US 2012/0030379 A1 Feb. 2, 2012

(30) Foreign Application Priority Data
Jul. 27, 2010 (KR) .................. 10-2010-0072272

(51) Int. Cl.
G06F 3/00 (2006.01)
H04B 5/00 (2006.01)

(52) U.S. Cl.
USPC ............................. 710/8; 455/41.1

(58) Field of Classification Search
USPC ....................... 710/8; 455/41, 41.1
See application file for complete search history.

(56) References Cited

U.S. PATENT DOCUMENTS

| 2006/0229014 | A1 | 10/2006 | Harada et al. | |
| 2007/0092203 | A1* | 4/2007 | Iwata et al. | 386/83 |
| 2008/0207124 | A1* | 8/2008 | Raisanen et al. | 455/41.2 |

FOREIGN PATENT DOCUMENTS

| KR | 2003-0037995 | 5/2003 |
| KR | 10-0703316 | 3/2007 |
| KR | 2008-0051292 | 6/2008 |

* cited by examiner

Primary Examiner — Farley Abad

(57) ABSTRACT

An apparatus and method support transitioning a terminal function between a portable terminal and a peripheral device. A terminal function transition is requested to one or more peripheral devices. Transition data including information regarding configuration of a terminal function is transmitted to the one or more peripheral devices, such that when the terminal function cannot be performed, at least one of the one or more peripheral devices is to perform the terminal function based on the information regarding configuration of the terminal function.

28 Claims, 7 Drawing Sheets

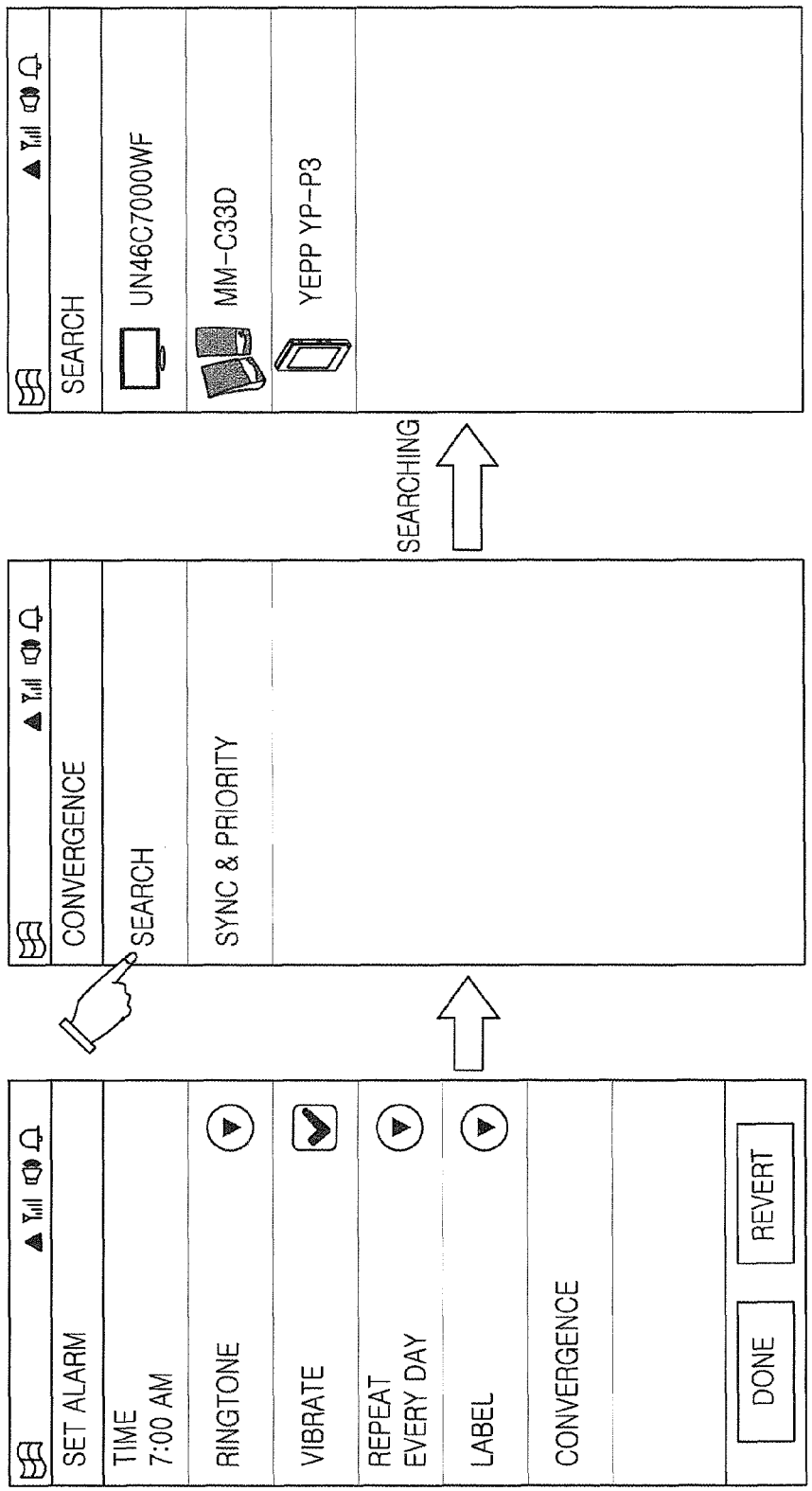

APPARATUS AND METHOD FOR TRANSITING TERMINAL FUNCTION BETWEEN PORTABLE TERMINAL AND PERIPHERAL APPARATUS

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jul. 27, 2010 and assigned Serial No. 10-2010-0072272, the entire disclosure of which is hereby incorporated by reference.

TECHNICAL FIELD OF THE INVENTION

The present invention relates to a portable terminal. More particularly, the present invention relates to an apparatus and method for transitioning a terminal function between the portable terminal and a peripheral device.

BACKGROUND OF THE INVENTION

The use of portable terminals is rapidly increasing due to the convenience of portability, and thus service providers (or terminal vendors) are competitively developing terminals that provide more convenient functions to capture more users. For example, the portable terminals provide various functions such as a phone book, a game, a scheduler, a short message service, accessing the Internet, an e-mail, an alarm, an MPEG Audio Layer-3 (MP3), a digital camera, an electronic dictionary, and such.

Among the aforementioned functions, the alarm function is used to examine whether it is a time point predetermined by a user and to report the arrival of the predetermined time point to the user by allowing a speaker to output a certain sound. In the conventional technique, the user is unable to achieve a primary purpose of using the alarm function when a portable terminal is not in a state of performing the alarm function due to battery discharge or other equivalent reasons or when the portable terminal is located in an area which cannot have an effect on the user.

SUMMARY OF THE INVENTION

To address the above-discussed deficiencies of the prior art, it is a primary object to provide an apparatus and method for transitioning a terminal function between a portable terminal and a peripheral device.

Another aspect of the present invention is to provide an apparatus and method for controlling a peripheral device to perform a specific terminal function when a portable terminal is unable to perform the specific terminal function or when the portable terminal is located in an area which cannot have an effect on a user and thus there is no user feedback even if the terminal function is performed.

In accordance with an aspect of the present invention, a method of operating a portable terminal for transitioning a terminal function between the portable terminal and a peripheral device is provided. A terminal function transition is requested to one or more peripheral devices. Transition data including information regarding configuration of a terminal function is transmitted to the one or more peripheral devices, such that when the terminal function cannot be performed, at least one of the one or more peripheral devices is to perform the terminal function based on the information regarding configuration of the terminal function.

In accordance with another aspect of the present invention, a method of operating a peripheral device for transitioning between a portable terminal and the peripheral device is provided. Transition data including information regarding configuration of a terminal function is received from the portable terminal. When the terminal function is not performed by the portable terminal, the terminal function is performed on behalf of the portable terminal based on the information regarding configuration of the terminal function.

In accordance with another aspect of the present invention, a portable terminal for transitioning a terminal function between a peripheral device and the portable terminal is provided. The portable terminal includes a near field communication transceiver and a terminal function transition manager. The near field communication transceiver transmits transition data including information regarding configuration of a terminal function to one or more peripheral devices. The terminal function transition manager generates the transition data and controls the near field communication transceiver communicate with the one or more peripheral devices such that when the terminal function cannot be performed by the portable terminal, at least one of the one or more peripheral devices is to perform the terminal function based on the information regarding configuration of the terminal function.

In accordance with yet another aspect of the present invention, a peripheral device for transitioning a terminal function between a portable terminal and the peripheral device is provided. The peripheral device includes a near field communication transceiver and a terminal function transition manager. The near field communication transceiver receives transition data including information regarding configuration of a terminal function from the portable terminal. The terminal function transition manager performs the terminal function on behalf of the portable terminal based on the information regarding configuration of the terminal function when the terminal function cannot be performed by the portable terminal.

BRIEF DESCRIPTION OF THE DRAWINGS

The above and other aspects, features and advantages of certain embodiments of the present invention will be more apparent from the following detailed description taken in conjunction with the accompanying drawings, in which:

FIGS. 5A-5C illustrate an example of a process for searching for a peripheral device of a portable terminal for transitioning a terminal function between the portable terminal and the peripheral device according to an embodiment of the present invention.

DETAILED DESCRIPTION OF THE INVENTION

FIGS. 1 through 6C discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. Embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein are to be understood based on the descriptions made herein.

The present invention described hereinafter relates to a method of transitioning a terminal function between a portable terminal and a peripheral device.

In particular, the present invention described below relates to an apparatus and method for controlling the peripheral device to perform a specific terminal function when the portable terminal is unable to perform the specific terminal function or when the portable terminal is located in an area which cannot have an effect on a user and thus there is no user feedback even if the terminal function is performed.

In the following description, the terminal function implies a function defined in the portable terminal. Examples of the terminal function may include an alarm function, a message receiving function, a call receiving function, and such. In addition, the peripheral device may include all multimedia devices capable of performing the terminal function. Examples of the peripheral device may include all devices capable of performing near field communication, such as an MPEG Audio Layer-3 (MP3) player, a Portable Multimedia Player (PMP), a Television (TV) set, and such.

Figure 1:
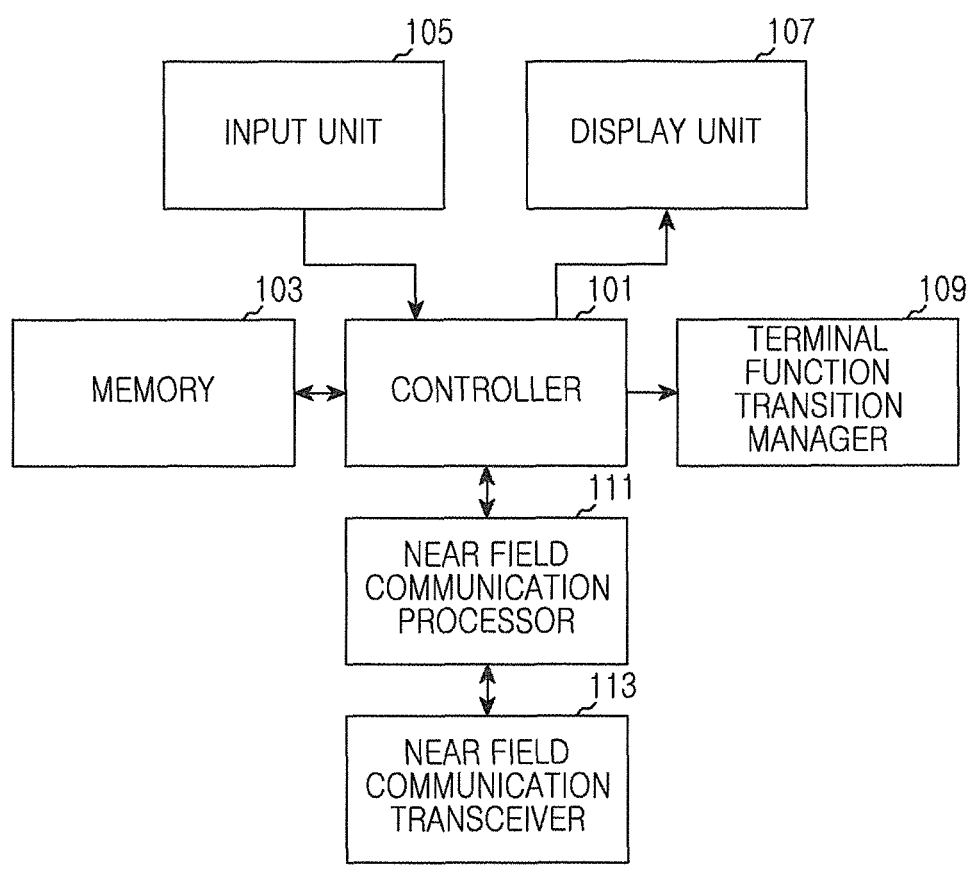
FIG. 1 is a block diagram of a portable terminal (or a peripheral device) according to an embodiment of the present invention.

FIG. 1 is a block diagram of a portable terminal (or a peripheral device) according to an embodiment of the present invention. In the following description, one apparatus will be used to explain operations of the portable terminal and the peripheral device.

Referring to FIG. 1, the portable terminal (or the peripheral device) includes a controller 101, a memory 103, an input unit 105, a display unit 107, a terminal function transition manager 109, a near field communication processor 111, and a near field communication transceiver 113.

The controller 101 provides overall control to the portable terminal (or the peripheral device). In addition to its normal function, according to the present invention, the controller 101 processes a function for transitioning a terminal function between the portable terminal and the peripheral device.

The memory 103 stores a microcode of a program for processing and control of the controller 102 and also stores temporary data that is generated while programs are performed. In particular, the memory 103 stores a program for transitioning the terminal function between the portable terminal and the peripheral device. In addition, the memory 103 of the portable terminal stores information regarding configuration of the terminal function (e.g. a notification period, a notification type, and a notification feedback period). For example, in an alarm function, the information regarding configuration of the terminal function may include an alarm time, an alarm bell sound, an alarm feedback period, and such. The memory 103 of the peripheral device stores information of priorities of devices found by the portable terminal, information indicating whether synchronization is established, and information regarding configuration of the terminal function.

The input unit 105 includes a plurality of function keys such as numeral key buttons, a menu button, a cancel (delete) button, a confirm button, and such. Key input data, which is input when the user presses these keys, is provided to the controller 101.

The display unit 107 displays information such as state information which is generated while the portable terminal (or peripheral device) operates, a limited number of characters, a large volume of moving and still pictures, and such. The display unit 107 may be a color Liquid Crystal Display (LCD).

When transition of a specific terminal function is requested to the peripheral device via the input unit 105, the terminal function transition manager 109 of the portable terminal searches for one or more peripheral devices for performing the terminal function by means of the near field communication processor 111 and the near field communication transceiver 113, and displays the found devices to the display unit 107. Thereafter, when the priorities of the found devices are input through the input unit 105, the terminal function transition manager 109 determines the priorities of the found devices based on the input priority information, and upon selection of a synchronization menu of the found devices (e.g. by means of the input unit 105), establishes synchronization among the found devices. Then, the terminal function transition manager 109 generates transition data including information of priorities of devices found by the portable terminal, information indicating whether synchronization is established, and information regarding configuration of the terminal function, and transmits the transition data to the found devices by means of the near field communication processor 111 and the near field communication transceiver 113. Thereafter, when the terminal function is triggered according to a predetermined triggering condition, the terminal function transition manager 109 determines whether it is possible to perform the terminal function. If it is possible to perform the terminal function, the terminal function transition manager 109 generates a terminal function execution notification function, transmits the signal to a lower-prioritized device by means of the near field communication processor 111 and the near field communication transceiver 113, and then performs the terminal function. Thereafter, the terminal function transition manager 109 determines whether a user feedback for the terminal function execution is input by means of the input unit 105. If the user feedback is not input, the terminal function transition manager 109 generates a user feedback absence notification signal, and transmits the signal to the lower-prioritized device by means of the near field communication processor 111 and the near field communication transceiver 113.

Furthermore, the terminal function transition manager 109 in a peripheral device receives the transition data from the portable terminal by means of the near field communication processor 111 and the near field communication transceiver 113, confirms the information of priorities of devices found by the portable terminal, the information indicating whether synchronization is established, and the information regarding configuration of the terminal function, stores the confirmed information to the memory 103, and then waits to receive the terminal function execution notification signal. If the terminal function execution notification signal is not received from a higher-prioritized device by means of the near field communication processor 111 and the near field communication transceiver 113, the terminal function transition manager 109 determines whether it is possible to execute the terminal function. If it is possible to execute the terminal function, the terminal function transition manager 109 generates a terminal function execution notification signal, transmits the signal to lower-prioritized device by means of the near field communication processor 111 and the near field communication transceiver 113, and performs the terminal function. Thereafter, the terminal function transition manager 109 determines whether a user feedback for the terminal function execution is input through the input unit 105. If the user feedback is not input, the terminal function transition manager 109 generates the user feedback absence notification signal, and transmits the signal to the lower-prioritized device by means of the near field communication processor 111 and the near field communication transceiver 113. If the terminal function execution notification signal is received from the higher-prioritized device by means of the near field communication processor 111 and the near field communication transceiver 113, the terminal function transition manager 109 waits to receive the user feedback absence notification signal, and if the user feedback absence notification signal is received from the higher-prioritized device by means of the near field communication processor 111 and the near field communication transceiver 113 as described above, the terminal function transition manager 109 performs the terminal function according to whether the terminal function can be performed. Although the terminal function transition manager 109 has been described as a separate component, the functions of the terminal function transition manager 109 may be performed by the controller 101, according to an embodiment of the present invention.

The near field communication processor 111 is a device for an interface between the near field communication transceiver 113 and the controller 101. The near field communication processor 111 codes a signal from the controller 101 to transmit the coded signal to the near field communication transceiver 113, and decodes a signal from the near field communication transceiver 113 to output the decoded signal to the controller 101. Although the near field communication processor 111 has been described as a separate component, the functions of the near field communication processor 111 may be performed by the controller 101, according to an embodiment of the present invention.

The near field communication transceiver 113 transmits a signal from the near field communication processor 111 to the peripheral device through near field communication such as WiFi, Bluetooth, infrared communication (IrDA), ZigBee, and such, and outputs a signal received from the peripheral device to the near field communication processor 111 through the near field communication.

Figure 2:
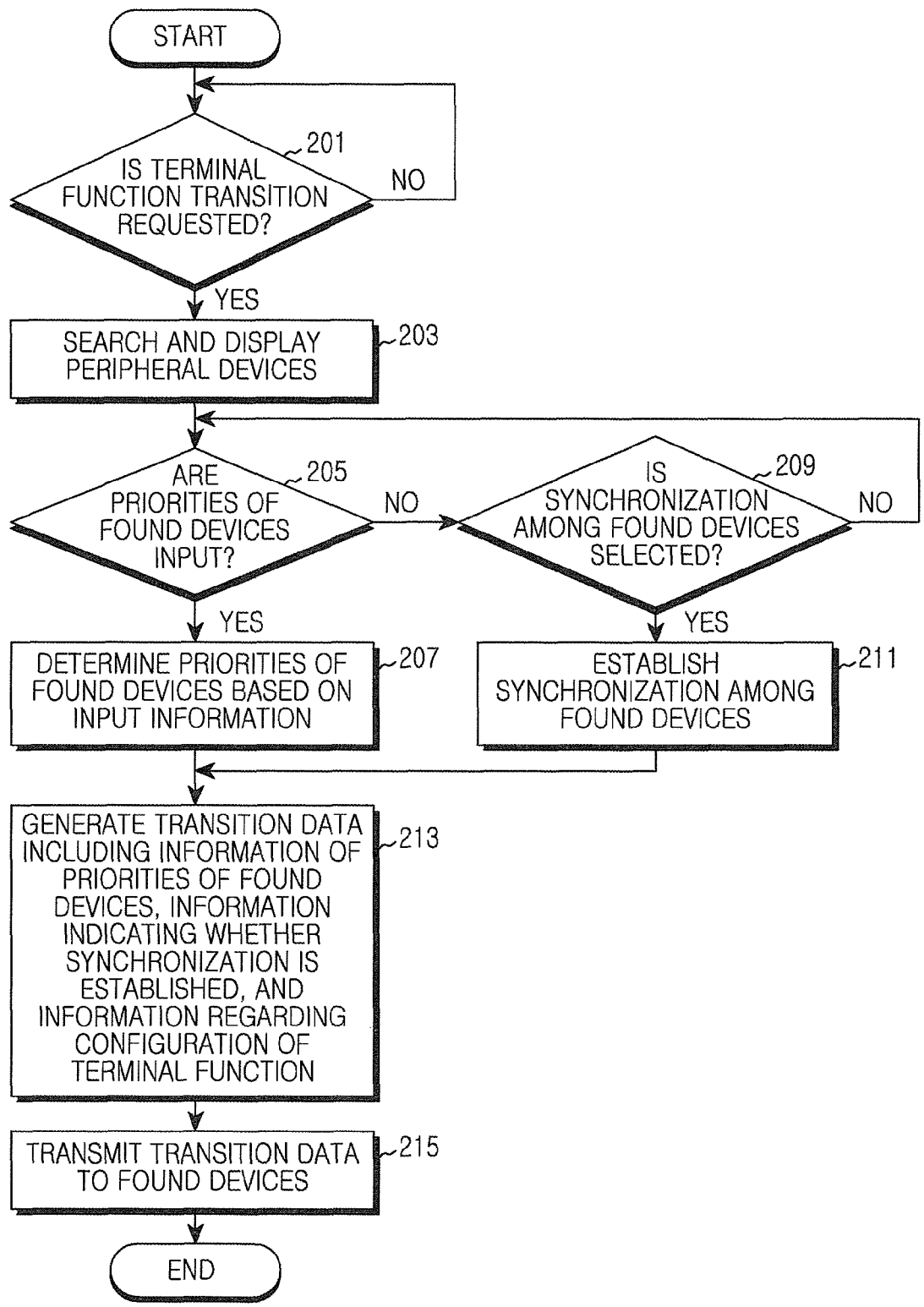
FIG. 2 illustrates a process for configuring a terminal function transition of a portable terminal for transitioning a terminal function between the portable terminal and a peripheral device according to an embodiment of the present invention.

FIG. 2 illustrates a process for configuring a terminal function transition of a portable terminal for transitioning a terminal function between the portable terminal and a peripheral device according to an embodiment of the present invention.

Referring to FIG. 2, the portable terminal determines whether transition for a specific terminal function is requested to the peripheral device according to user input in block 201.

If it is determined in block 201 that the transition of the terminal function is requested to the peripheral device, proceeding to block 203, the portable terminal searches for one or more devices for performing the terminal function, and displays type information of the one or more devices found to a display unit. For example, in an alarm function, as illustrated in FIG. 5, when a convergence menu for transitioning the alarm function to the peripheral device is selected among alarm setup-related menus by user input (see FIG. 5A), the portable terminal can display a search menu and a sync and priority menu as a sub-menu of the convergence menu (see FIG. 5B). If the search menu is selected among them, the portable terminal can search for one or more peripheral devices for performing the alarm function, and can display the found peripheral devices to the display unit (see FIG. 5C).

In block 205, the portable terminal determines whether priorities of the found devices have been input.

If it is determined in block 205 that the priorities of the found devices are entered, proceeding to block 207, the portable terminal determines the priorities of the found devices based on the input priority information and proceeds to block 213. As such, by determining the priorities of the found devices, the found devices can perform the terminal function in sequence according to the determined priorities.

Otherwise, if it is determined in block 205 that the priorities of the found devices have not been entered during a predetermined time, proceeding to block 209, the portable terminal determines whether the sync menu is selected to establish synchronization among the found devices according to user input.

If it is determined in block 209 that the sync menu is not selected during the predetermined time, the terminal returns to block 205.

Otherwise, if it is determined in block 209 that the sync menu is selected to establish synchronization among the found devices, proceeding to block 211, the portable terminal establishes synchronization among the found devices and proceeds to block 213. Herein, establishing synchronization among the found devices is an operation of equalizing the priorities of the found devices. In doing so, the found devices can concurrently perform the terminal function.

Figure 6C:
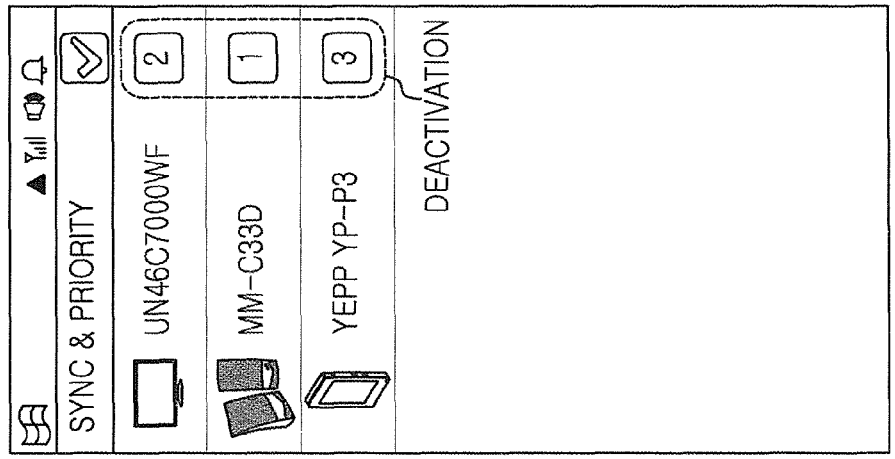
FIGS. 6A-6C illustrates an example of a process for determining priority and synchronization for a peripheral device of a portable terminal for transitioning a terminal function between the portable terminal and the peripheral device according to an embodiment of the present invention.
Figure 6B:
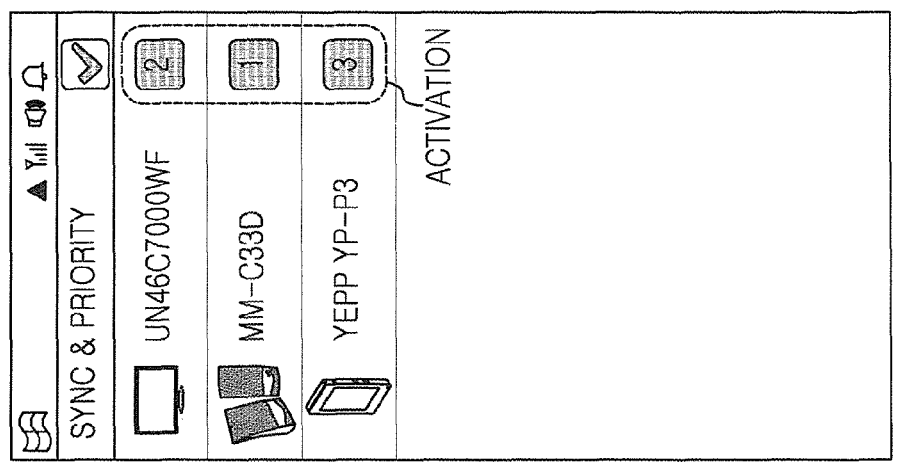
Figure 6A:
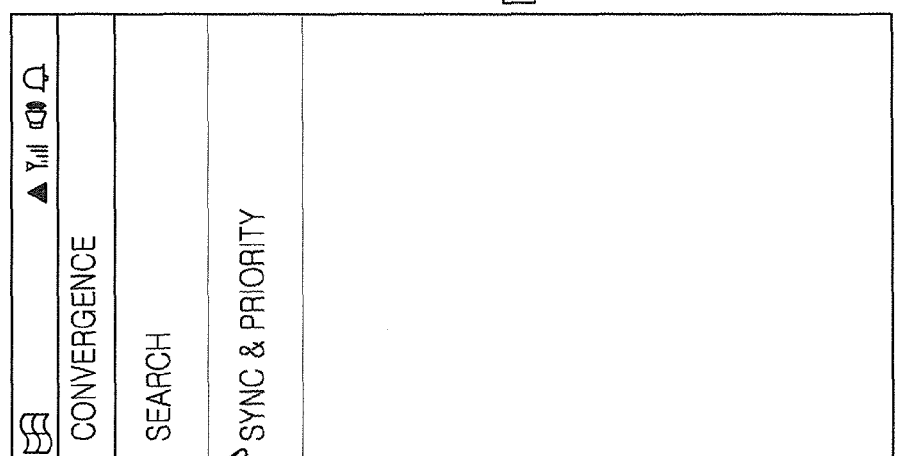

For example, in an alarm function, as illustrated in FIGS. 6A-6C, if a sync & priority menu is selected among sub-menus of a convergence menu (see FIG. 6A), an input window capable of displaying whether to establish synchronization and an input window for each found device capable of determining the priorities of the found devices are displayed, and an input window related to one of synchronization and priority can be activated according to user's selection (see FIGS. 6B and 6C).

In block 213, the portable terminal generates transition data including information of priorities of the found devices, information indicating whether synchronization is established, and information regarding configuration of the terminal function (e.g. a notification period, a notification type, and a notification feedback period). For example, in the alarm function, the information regarding configuration of terminal function may include an alarm time, an alarm bell sound, an alarm feedback period, and such.

In block 215, the portable terminal transmits the generated transition data to the found devices.

Thereafter, the process of FIG. 2 ends.

Figure 3:
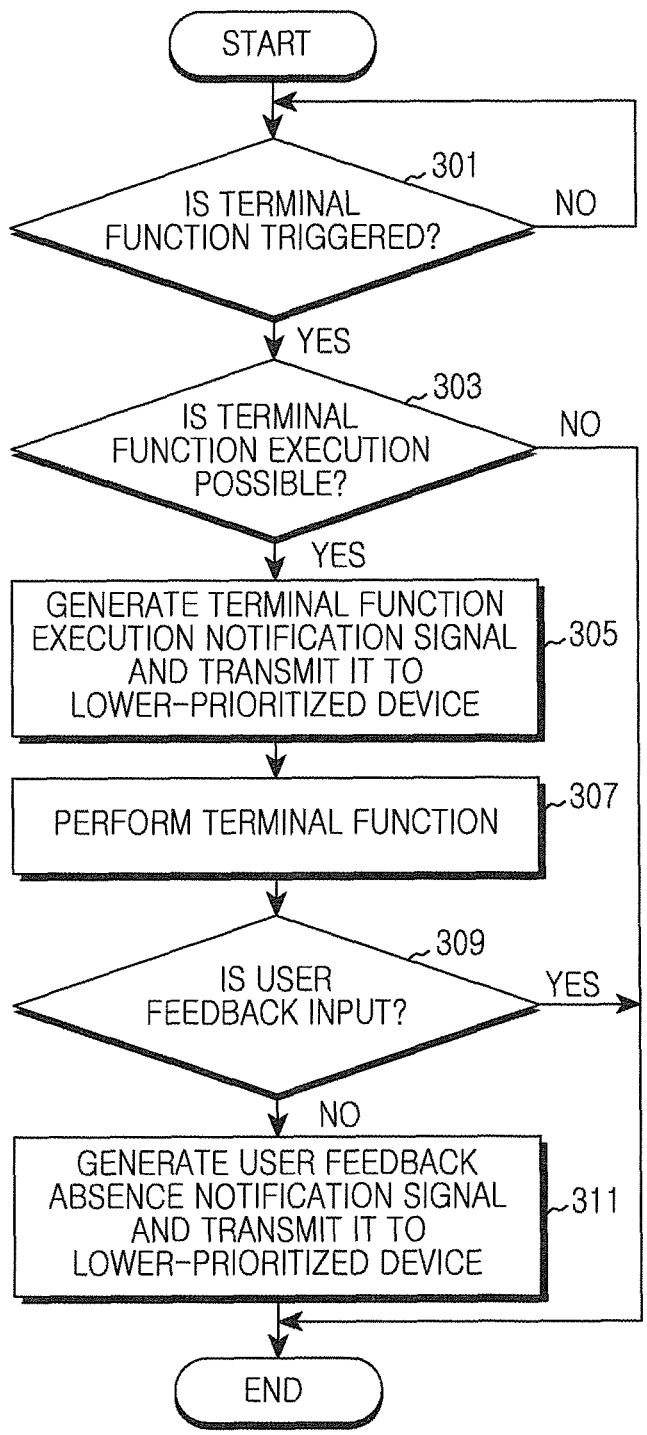
FIG. 3 illustrates a process for performing a terminal function of a portable terminal for transitioning the terminal function between the portable terminal and a peripheral device according to an embodiment of the present invention.

FIG. 3 illustrates a process for performing a terminal function of a portable terminal for transitioning the terminal function between the portable terminal and a peripheral device according, to an embodiment of the present invention.

Referring to FIG. 3, the portable terminal determines whether the terminal function is triggered according to a predetermined triggering condition in block 301.

If it is determined in block 301 that the terminal function is triggered according to the predetermined triggering condition, proceeding to block 303, the portable terminal determines whether the terminal function can be performed. For example, if the portable terminal cannot be performed due to battery discharge or other equivalent reasons, the portable terminal can determine that it is impossible to perform the terminal function.

If it is determined in block 303 that the terminal function can be performed, proceeding to block 305, the portable terminal generates a terminal function execution notification signal and transmits the signal to a lower-prioritized device. In block 307, the portable terminal performs the corresponding terminal function. Herein, the lower-prioritized device waits for receiving a user feedback absence notification signal upon receiving the terminal function execution notification signal.

In block 309, the portable terminal determines whether a user feedback for the terminal function execution is input. For example, in the alarm function, the user feedback may be a confirm key.

If it is determined in block 309 that the user feedback is not input during a predetermined time period, proceeding to block 311, the portable terminal generates the user feedback absence notification signal and transmits the signal to the lower-prioritized device. Herein, upon receiving the user feedback absence notification signal, the lower-prioritized device which has waited for receiving the user feedback absence notification signal performs the terminal function according to whether the terminal function can be performed.

Otherwise, if it determined in block 309 that the user feedback is input, the process of FIG. 3 ends without transmission of the user feedback absence notification signal. Herein, if the lower-prioritized device which has waited for receiving the user feedback absence notification signal does not receive the user feedback absence notification signal during a predetermined time period (e.g. notification feedback period), the process of FIG. 3 ends.

Meanwhile, if it is determined in block 303 that the terminal function cannot be performed, the procedure of FIG. 3 ends without transmission of the terminal function execution notification signal. Herein, if the terminal function execution notification signal is not received during the predetermined time period (e.g. based on the notification period), the lower-prioritized device performs the terminal function if the terminal function can be performed.

Figure 4A:
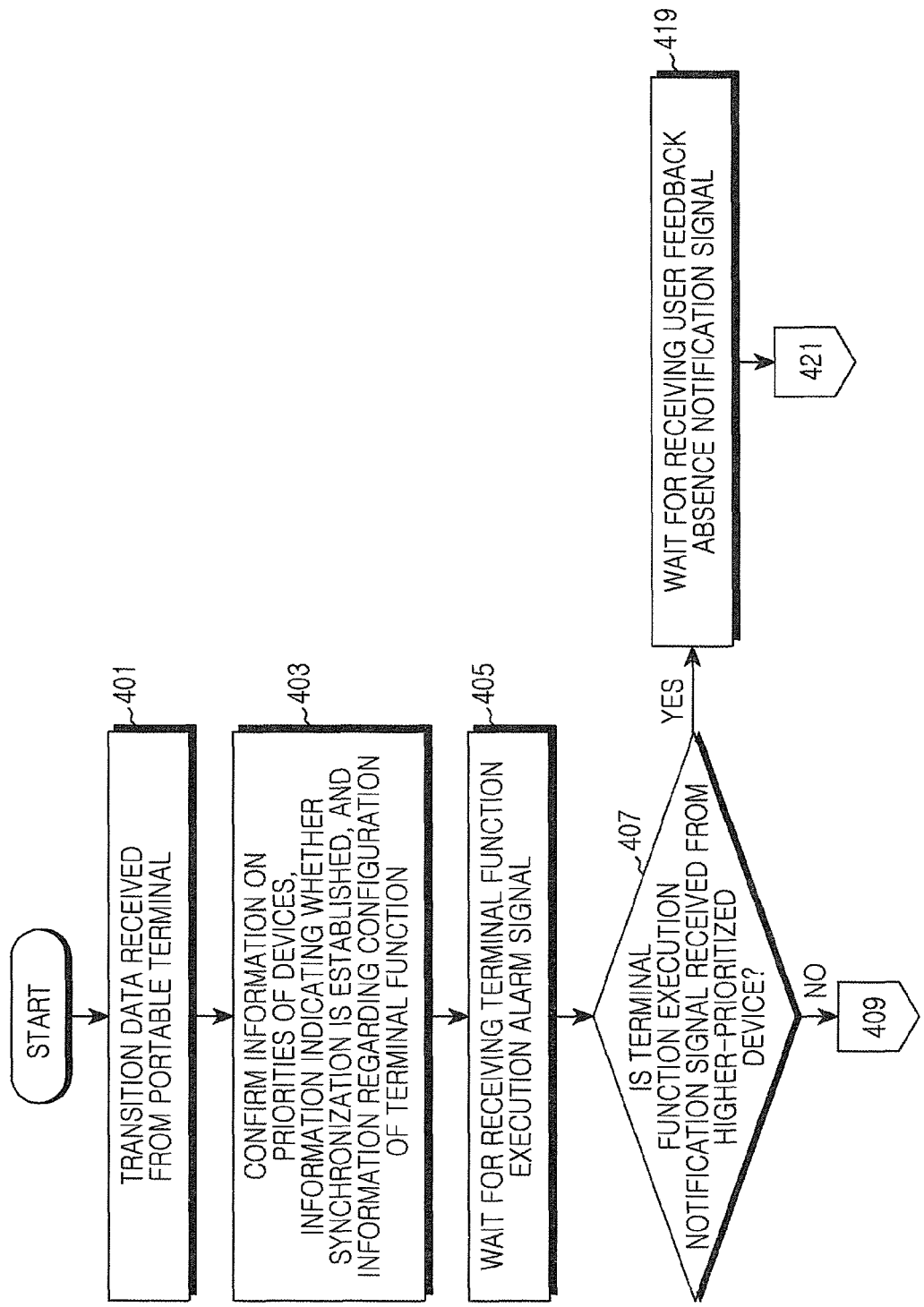
FIGS. 4A and 4B illustrate a process for performing a terminal function of a peripheral device for transitioning the terminal function between a portable terminal and the peripheral device according to an embodiment of the present invention.
Figure 4B:
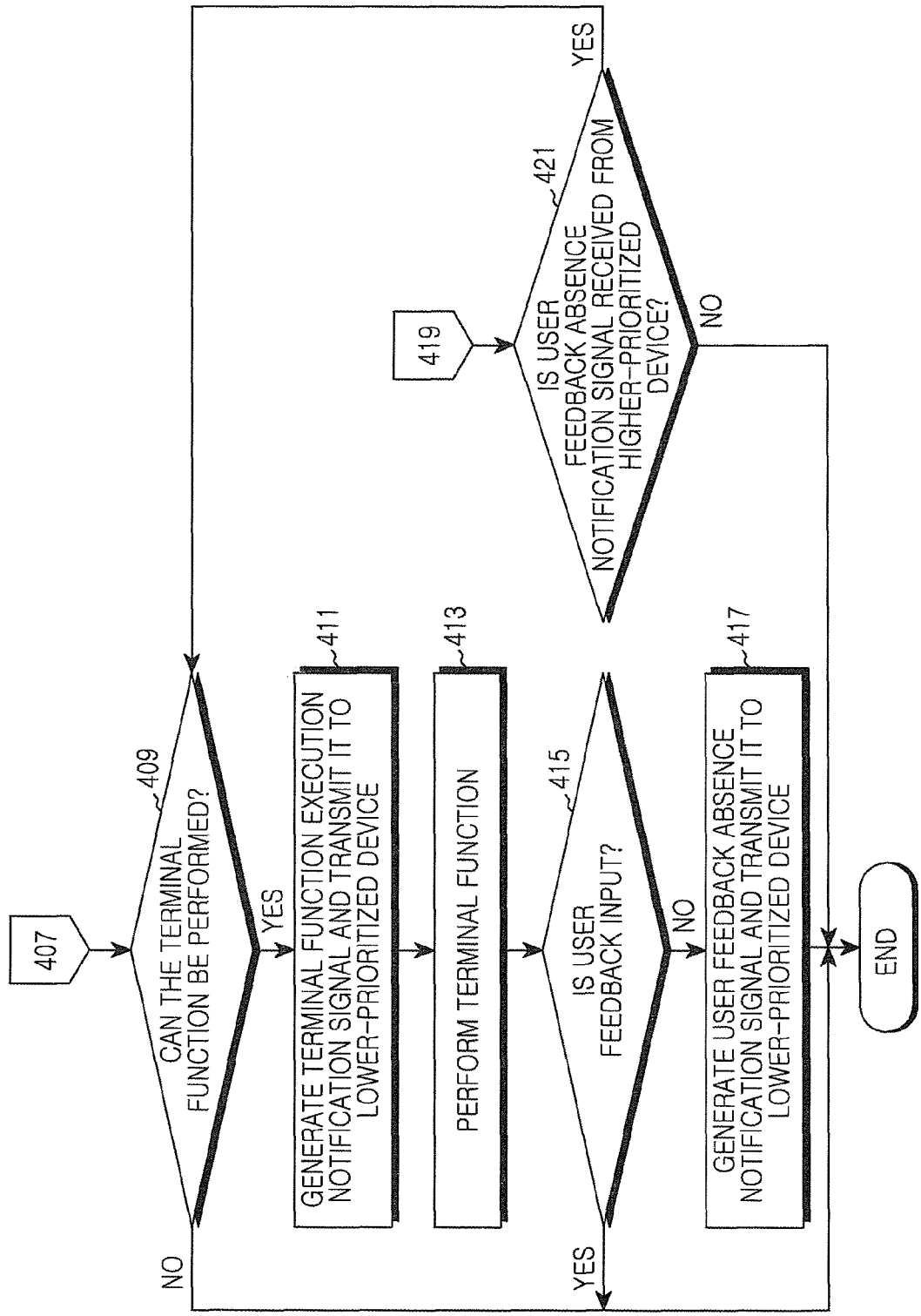

FIGS. 4A and 4B illustrate a process for performing a terminal function of a peripheral device for transitioning the terminal function between a portable terminal and the peripheral device according to an embodiment of the present invention.

Referring to FIGS. 4A and 4B, the peripheral device receives transition data from the portable terminal in block 401.

In block 403, the peripheral device uses the received transition data to confirm information of priorities of devices found by the portable terminal, information indicating whether synchronization is established, and information regarding configuration of the terminal function (e.g. a triggering condition for executing the terminal function, a notification period, a notification type, and a notification feedback period). In block 405, the portable terminal waits to receive the terminal function execution notification signal. For example, in an alarm function, the information regarding configuration of terminal function may include an alarm time, an alarm bell sound, an alarm feedback period, and such.

Herein, the peripheral device can recognize a higher-prioritized device and a lower-prioritized device based on the information of the priorities of the devices and the information indicating whether synchronization is established. For example, if the peripheral device is set to the top priority in the priority information, the peripheral device can determine that its higher-prioritized device is the portable terminal and its lower-prioritized device is another peripheral device that has a next priority. In addition, if the information indicating whether synchronization is established indicates the set-up (establishment) of synchronization, the peripheral device can determine that all peripheral devices including itself have the same priority and that the higher-prioritized device of all peripheral devices is the portable terminal.

In block 407, the peripheral device determines whether a terminal function execution notification signal is received from the higher-prioritized device.

If it is determined in block 407 that the terminal function execution notification signal is not received from the higher-prioritized device during the predetermined time period (e.g. based on the notification period), proceeding to block 409, the peripheral device determines that the terminal function cannot be performed by the higher-prioritized device, and determines whether the terminal function can be performed by the peripheral device. For example, if the portable terminal cannot perform the terminal function due to battery discharge or other equivalent reasons, the portable terminal can determine that the portable terminal (or a device with a higher priority level) cannot perform the terminal function. In an embodiment, the predetermined time period can be determined by each device according based on the notification period and the respective priority level such that lower priority devices wait longer than higher priority devices after the trigger condition for executing the terminal function is satisfied. Alternatively, the transition data may indicate a separate notification period for each priority level or device.

If it is determined in block 409 that the terminal function can be performed, proceeding to block 411, the portable terminal generates the terminal function execution notification signal and transmits the signal to the lower-prioritized device. In block 413, the portable terminal performs the corresponding terminal function based on the information regarding configuration of the terminal function. Herein, the lower-prioritized device waits to receive a user feedback absence notification signal upon receiving the terminal function execution notification signal.

In block 415, the portable terminal determines whether a user feedback for the terminal function execution is input. For example, in the alarm function, the user feedback may be a confirm key.

If it is determined in block 415 that the user feedback is not input during a predetermined time period, proceeding to block 417, the portable terminal generates the user feedback absence notification signal and transmits the signal to the lower-prioritized device. Herein, upon receiving the user feedback absence notification signal, the lower-prioritized device which has waited for receiving the user feedback absence notification signal performs the terminal function according to whether the terminal function can be performed.

Otherwise, if it determined in block 415 that the user feedback is input, the procedure of FIG. 4 ends without transmission of the user feedback absence notification signal. Herein, if the lower-prioritized device which has waited for receiving the user feedback absence notification signal does not receive the user feedback absence notification signal during a predetermined time period, the procedure of FIG. 4 ends.

Meanwhile, if it is determined in block 409 that the terminal function cannot be performed, the procedure of FIG. 4 ends without transmission of the terminal function execution notification signal. Herein, if the terminal function execution notification signal is not received during the predetermined time period, the lower-prioritized device performs the terminal function according to whether the terminal function can be performed.

Meanwhile, if it is determined in block 407 that the terminal function execution notification signal is received from the higher-prioritized device, proceeding to block 419, the peripheral device determines that the terminal function can be performed by the higher-prioritized device, and waits to receive the user feedback absence notification signal. Thereafter, the procedure of FIG. 4 proceeds to block 421.

In block 421, the peripheral device determines whether the user feedback absence notification signal is received from the higher-prioritized device within a predetermined time period (e.g. based on the notification feedback period). In an embodiment the predetermined time period may be determined by each device based on the notification feedback period and the respective priority level. Alternatively, the transition data may include a separate notification feedback period for each priority level or device.

If it is determined in block 421 that the user feedback absence notification signal is received from the higher-prioritized device, the peripheral device determines that the user feedback absence notification signal is not input for the terminal function performed by the higher-prioritized device. Then, the peripheral device proceeds to block 409.

Otherwise, if it is determined in block 421 that the user feedback absence notification signal is not received from the higher-prioritized device during a predetermined time period, the peripheral device determines that a user feedback is input for the terminal function performed by the higher-prioritized device. Then, the procedure of FIG. 4 ends.

If the peripheral device is set to the lowest priority, there is no device that has a next lower priority among the peripheral devices. Therefore, it is apparent that there is no need to perform the steps (i.e., blocks 411 and 417) of transmitting a signal (i.e., the terminal function execution notification signal or the user feedback absence notification signal) to a lower-prioritized device. Alternatively, in another embodiment, if the peripheral device is set to the lowest priority, the lower-prioritized device (i.e. the device with the next level of priority) among the peripheral devices can be determined to the portable terminal, and the process of FIGS. 4A-4B can be repeated until a user feedback is input.

According to embodiments of the present invention, a peripheral device is allowed to perform a specific terminal function when a portable terminal is unable to perform the specific terminal function or when the portable terminal is located in an area which cannot have an effect on a user and thus there is no user feedback even if the terminal function is performed. Therefore, there is an advantage in that a primary purpose of the terminal function can be achieved.

While the present invention has been particularly shown and described with reference to embodiments thereof, it will be understood by those skilled in the art that various changes in form and details may be made therein without departing from the spirit and scope of the present invention as defined by the appended claims.

What is claimed is:

1. A method of operating a portable terminal for transitioning a terminal function between the portable terminal and a peripheral device, comprising:
   transmitting a request for the terminal function to transition to one or more peripheral devices;
   performing the terminal function; and
   transmitting transition data including information regarding configuration of the terminal function to the one or more peripheral devices, such that when a feedback input in response to the terminal function is not input within a predetermined time period, at least one of the one or more peripheral devices is to perform the terminal function based on the information regarding configuration of the terminal function.

2. The method of claim 1, wherein the transmitting of the request for the terminal function to transition to the one or more peripheral devices comprises:
   searching for peripheral devices for performing the terminal function;
   displaying the found peripheral devices on a display unit;
   determining whether priorities of the found peripheral devices are input; and
   when the priorities of the found devices are input, determining the priorities of the found devices based on the input priority information.

3. The method of claim 1, wherein transmitting the request for the terminal function to transition to the one or more peripheral devices comprises:
   searching for peripheral devices for performing the terminal function;
   displaying the found peripheral devices on a display unit;
   determining whether a sync menu is selected to establish synchronization among the found devices;
   when the sync menu is selected, establishing synchronization by equalizing priorities of the found devices.

4. The method of claim 1, wherein the transition data further includes information of priorities of devices found by the portable terminal and information indicating whether synchronization is established.

5. The method of claim 1, wherein the information regarding configuration of the terminal function includes at least one of a notification period, a notification type, and a feedback period.

6. The method of claim 1, further comprising:
   before performing the terminal function, when the terminal function is triggered by a predetermined triggering condition, determining whether the terminal function can be performed by the portable terminal; and
   when the terminal function can be performed, controlling the at least one of the one or more peripheral devices to wait for a user feedback absence notification signal by transmitting a terminal function execution notification signal to the at least one of the one or more peripheral devices.

7. The method of claim 6, wherein the transmitting transition data comprises:
   when the feedback input is not input, controlling a peripheral device with a next priority level to perform the terminal function based on the information regarding configuration of the terminal function by transmitting the user feedback absence notification signal to the peripheral device, and
   wherein the transition data indicates the sequence in which each of the one or more peripheral devices is to perform the terminal function based on the information regarding configuration of the terminal function when the terminal function execution notification signal is not transmitted to the peripheral device.

8. A method of operating a peripheral device for transitioning between a portable terminal and the peripheral device, comprising:
   receiving transition data including information regarding configuration of a terminal function from the portable terminal;
   when the terminal function is not performed by the portable terminal, performing the terminal function on behalf of the portable terminal based on the information regarding configuration of the terminal function; and when a feedback input is not input in response to the terminal function within a predetermined time period, controlling a device that is a lower-prioritized device among devices found by the portable terminal to perform the terminal function by transmitting a use feedback absence notification signal to the lower-prioritized device.

9. The method of claim 8, wherein the transition data further includes information of priorities of devices found by the portable terminal and information indicating whether synchronization is established.

10. The method of claim 8, wherein the information regarding configuration of the terminal function includes at least one of a notification period, a notification type, and a feedback period.

11. The method of claim 8, further comprising:
determining whether a terminal function execution notification signal is received from a higher-prioritized device among the devices found by the portable terminal; and
when the terminal function execution notification signal is not received, determining that the terminal function cannot be performed by the higher-prioritized device.

12. The method of claim 11, further comprising:
when the terminal function execution notification signal is received from the higher-prioritized device, waiting for a user feedback absence notification signal;
when the user feedback absence notification signal is received from the higher-prioritized device, performing the terminal function based on the information regarding configuration of the terminal function; and
when the user feedback absence notification signal is not received from the higher-prioritized device, not performing the terminal function.

13. The method of claim 8, further comprising:
when the terminal function cannot be performed by the portable terminal, determining whether the terminal function can be performed by the peripheral device;
when the terminal function can be performed by the peripheral device, controlling at least one lower-prioritized device among the devices found by the portable terminal to wait for a user feedback absence notification signal by transmitting a terminal function execution notification signal to the at least one lower-prioritized device; and
when the terminal function cannot be performed by the peripheral device, controlling the lower-prioritized device to perform the terminal function based on the information regarding configuration of the terminal function by not transmitting the terminal function execution notification signal to the lower-prioritized terminal.

14. The method of claim 8, further comprising:
when the feedback input is input in response to the terminal function, controlling the lower-prioritized device to not perform the terminal function by not transmitting the user feedback absence notification signal to the lower-prioritized device.

15. A portable terminal for transitioning a terminal function between a peripheral device and the portable terminal, comprising:
a near field communication transceiver configured to transmit transition data including information regarding configuration of a terminal function to one or more peripheral devices; and a terminal function transition manager configured to generate the transition data and control the near field communication transceiver to communicate with the one or more peripheral devices such that when a feedback input in response to the terminal function performed by the portable terminal is not input within a predetermined time period, at least one of the one or more peripheral devices is to perform the terminal function based on the information regarding configuration of the terminal function.

16. The portable terminal of claim 15,
wherein when a terminal function transition is requested to the one or more peripheral devices, the near field communication transceiver is further configured to search for peripheral devices for performing the terminal function, and
wherein the terminal function transition manager is further configured to display the found peripheral devices on a display unit, determine whether priorities of the found peripheral devices are input, and determine the priorities of the found devices based on the input priority information when the priorities of the found devices are input.

17. The portable terminal of claim 15,
wherein when the terminal function transition is requested to the one or more peripheral devices, the near field communication transceiver is further configured to search for peripheral devices for performing the terminal function, and
wherein the terminal function transition manager is further configured to display the found peripheral devices on a display unit, determine whether a sync menu is selected by means of the input unit to establish synchronization among the found devices, and establish synchronization by equalizing the priorities of the found devices when the sync menu is selected.

18. The portable terminal of claim 15, wherein the transition data further includes information of priorities of devices found by the portable terminal and information indicating whether synchronization is established.

19. The portable terminal of claim 15, wherein the information regarding configuration of the terminal function includes at least one of a notification period, a notification type, and a feedback period.

20. The portable terminal of claim 15, wherein the terminal function transition manager is further configured to:
when the terminal function is triggered by a predetermined triggering condition, determine whether the terminal function can be performed by the portable terminal;
when the terminal function can be performed, control the at least one of the one or more peripheral devices to wait for a user feedback absence notification signal by transmitting a terminal function execution notification signal to the peripheral device; and
perform the terminal function.

21. The portable terminal of claim 20, wherein the terminal function transition manager is further configured to:
when the feedback input is not input, control a peripheral device with a next priority level to perform the terminal function based on the information regarding configuration of the terminal function by transmitting the user feedback absence notification signal to the peripheral device,
wherein the transition data indicates the sequence in which each of the one or more peripheral devices is to perform the terminal function based on the information regarding configuration of the terminal function when the terminal function execution notification signal is not transmitted to the peripheral device.

22. A peripheral device for transitioning a terminal function between a portable terminal and the peripheral device, comprising:
- a near field communication transceiver configured to receive transition data including information regarding configuration of a terminal function from the portable terminal; and
- a terminal function transition manager configured to perform the terminal function on behalf of the portable terminal based on the information regarding configuration of the terminal function when the terminal function is not performed by the portable terminal, and
- control, when a feedback input is not input in response to the terminal function within a predetermined time period, a device that is a lower-prioritized device among the devices found by the portable terminal to perform the terminal function by transmitting a user feedback absence notification signal to the lower-prioritized device.

23. The peripheral device of claim 22, wherein the transition data further includes information of priorities of devices found by the portable terminal and information indicating whether synchronization is established.

24. The peripheral device of claim 22, wherein the information regarding configuration of the terminal function includes at least one of a notification period, a notification type, and a feedback period.

25. The peripheral device of claim 22, wherein the terminal function transition manager is further configured to:
- determine whether a terminal function execution notification signal is received from a higher-prioritized device among the peripheral devices found by the portable terminal; and
- when the terminal function execution notification signal is not received, determine that the terminal function cannot be performed by the higher-prioritized device.

26. The peripheral device of claim 25, wherein the terminal function transition manager is further configured to:
- wait for reception of a user feedback absence notification signal when the terminal function execution notification signal is received by means of the near field communication transceiver from the higher-prioritized device;
- perform the terminal function based on the information regarding configuration of the terminal function when the user feedback absence notification signal is received from the higher-prioritized device by means of the near field communication transceiver; and
- not perform the terminal function when the user feedback absence notification signal is not received from the higher-prioritized device.

27. The peripheral device of claim 22, wherein the terminal function transition manager is further configured to:
- determine whether the terminal function can be performed by the peripheral device when the terminal function cannot be performed by the portable terminal;
- control at least one lower-prioritized device among the devices found by the portable terminal to wait for a user feedback absence notification signal by transmitting a terminal function execution notification signal to the lower-prioritized device when the terminal function can be performed by the peripheral device; and
- control the lower-prioritized device to perform the terminal function based on the information regarding configuration of the terminal function by not transmitting the terminal function execution notification signal to the lower-prioritized terminal when the terminal function cannot be performed by the peripheral device.

28. The peripheral device of claim 22, wherein the terminal function transition manager is further configured to:
- when the feedback input is input in response to the terminal function, control the lower-prioritized device to not perform the terminal function by not transmitting the user feedback absence notification signal to the lower-prioritized device.

* * * * *